United States Patent
Gonda et al.

(10) Patent No.: US 9,695,079 B2
(45) Date of Patent: Jul. 4, 2017

(54) PRODUCTION METHOD OF OPTICAL FIBER PREFORM, AND PRODUCTION METHOD OF OPTICAL FIBER

(71) Applicant: FURUKAWA ELECTRIC CO., LTD., Tokyo (JP)

(72) Inventors: Tomohiro Gonda, Tokyo (JP); Katsunori Imamura, Tokyo (JP); Ryo Miyabe, Tokyo (JP); Ryuichi Sugizaki, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/920,534

(22) Filed: Oct. 22, 2015

(65) Prior Publication Data
US 2016/0075590 A1    Mar. 17, 2016

Related U.S. Application Data

(63) Continuation of application No. PCT/JP2014/061089, filed on Apr. 18, 2014.
(Continued)

(51) Int. Cl.
*C03B 37/012* (2006.01)
*C03B 37/018* (2006.01)
(Continued)

(52) U.S. Cl.
CPC ...... *C03B 37/01222* (2013.01); *C03B 37/018* (2013.01); *C03B 37/01205* (2013.01);
(Continued)

(58) Field of Classification Search
CPC ............ C03B 19/1407; C03B 19/1453; C03B 19/1469; C03B 19/1476; C03B 19/1484;
(Continued)

(56) References Cited

U.S. PATENT DOCUMENTS

| | | | |
|---|---|---|---|
| 5,792,233 A | 8/1998 | Chesnoy et al. |
| 5,944,867 A | 8/1999 | Chesnoy et al. |

FOREIGN PATENT DOCUMENTS

| | | | |
|---|---|---|---|
| JP | 57-082805 A | 5/1982 |
| JP | 08-119656 A | 5/1996 |

(Continued)

OTHER PUBLICATIONS

JP S57-82805 A Partial Translation by Steven Spar, USPTO [p. 2, lower right column, line 11—p. 3, upper left column, line 11] on Sep. 19, 2016.*

(Continued)

*Primary Examiner* — Jodi C Franklin
(74) *Attorney, Agent, or Firm* — Oblon, McClelland, Maier & Neustadt, L.L.P.

(57) ABSTRACT

A production method of an optical fiber preform includes first preparing a first preform having a plurality of glass preforms and a first cladding portion disposed between the plurality of glass preforms, and first arranging a second cladding portion to surround the first preform. At the first arranging, a material gas and a combustion gas are ejected from a burner to produce glass particles. The first preform and the burner are moved relative to each other in a longitudinal direction of the first preform. The glass particles are deposited on the first preform.

17 Claims, 18 Drawing Sheets

Related U.S. Application Data

(60) Provisional application No. 61/818,226, filed on May 1, 2013.

(51) Int. Cl.
*G02B 6/02* (2006.01)
*C03B 37/014* (2006.01)
*C03B 37/027* (2006.01)

(52) U.S. Cl.
CPC .. *C03B 37/01234* (2013.01); *C03B 37/01486* (2013.01); *C03B 37/01493* (2013.01); *C03B 37/027* (2013.01); *G02B 6/02042* (2013.01); *C03B 2203/23* (2013.01); *C03B 2203/34* (2013.01); *C03B 2207/50* (2013.01)

(58) Field of Classification Search
CPC ............ C03B 19/1492; C03B 2203/14; C03B 2203/32; C03B 2203/34; C03B 2203/40; C03B 2203/42
See application file for complete search history.

(56) References Cited

FOREIGN PATENT DOCUMENTS

| JP | 09-090143 A | 4/1997 |
|---|---|---|
| JP | 2013-177269 A | 9/2013 |

OTHER PUBLICATIONS

International Search Report issued May 27, 2014 in PCT/JP2014/061089 filed Apr. 18, 2014, with English translation.
Written Opinion issued May 27, 2014 in PCT/JP2014/061089 filed Apr. 18, 2014.

\* cited by examiner

PRODUCTION METHOD OF OPTICAL FIBER PREFORM, AND PRODUCTION METHOD OF OPTICAL FIBER

CROSS-REFERENCE TO RELATED APPLICATION

This application is a continuation of PCT International Application No. PCT/JP2014/061089 filed on Apr. 18, 2014 which claims the benefit of priority from U.S. Patent Application No. 61/818,226 filed on May 1, 2013, the entire contents of which are incorporated herein by reference.

BACKGROUND OF THE INVENTION

1. Field of the Invention

The present invention relates to a production method of an optical fiber preform and a production method of an optical fiber.

2. Description of the Related Art

A multi-core fiber (MCF) is an optical fiber including a plurality of cores in one optical fiber, and is new type of optical fiber capable of disposing many core portions in a reduced space. This multi-core fiber makes us anticipate realization of new optical propagation such as large-capacity transmission of image and spatial multiplexing transmission or the like.

A production method of a multi-core fiber includes, for example, a stack-and-draw method, a drilling method or the like.

The stack-and-draw method is used to form an optical fiber preform by disposing glass rods for forming a cladding of which refractive index is lower than that of the cores around glass rods (core preforms) for forming the cores, inserting them into a jacket tube made of glass, and then heating and drawing them (for example, see Japanese Patent Application Laid-open Publication No. H8-119656).

The drilling method is used to form an optical fiber preform by forming holes (through holes) in a rod-shaped base material made of glass with a drill, and inserting glass rods (core preforms) for forming cores into the holes (for example, see Japanese Patent Application Laid-open Publication No. H9-90143).

However, the stack-and-draw method had a problem that a positioning accuracy for the core decreased since the core preforms are inserted inside the jacket tube to be subjected to heating and drawing. Also, the drilling method had a problem of increased machining cost since the holes are formed on the rod-shaped base material with the drill.

To address this, Japanese Patent Application Laid-open Publication No. S57-82805 discloses a production method of a multi-core fiber preform for obtaining the multi-core fiber preform by arranging a plurality of core preforms for forming cores at predetermined positions, depositing glass particles from outside these core preforms, forming a porous layer becoming a cladding, and then sintering it.

SUMMARY OF THE INVENTION

It is an object of the present invention to at least partially solve the problems in the conventional technology.

In accordance with one aspect of the present invention, a production method of an optical fiber preform includes first preparing a first preform having a plurality of glass preforms and a first cladding portion disposed between the plurality of glass preforms, and first arranging a second cladding portion to surround the first preform. At the first arranging, a material gas and a combustion gas are ejected from a burner to produce glass particles. The first preform and the burner are moved relative to each other in a longitudinal direction of the first preform. The glass particles are deposited on the first preform.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
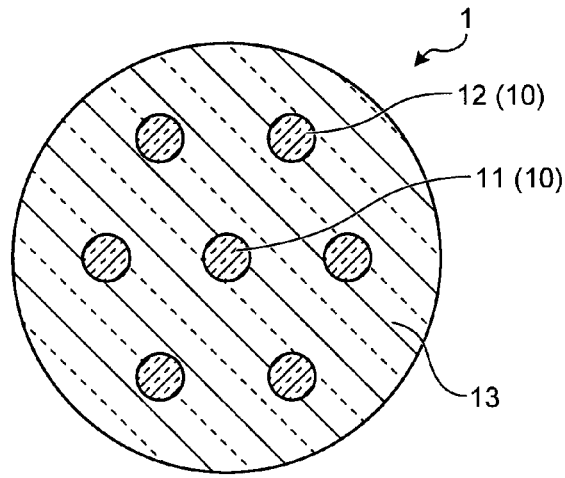
FIG. 1 is a cross-sectional view of a multi-core fiber preform produced by a production method of a multi-core fiber preform according to a first embodiment of the present invention.

Hereafter, embodiments of a production method of a multi-core fiber preform and a production method of a multi-core fiber according to embodiments of the present invention will be explained with reference to the drawings. The embodiments do not limit the present invention. In all the drawings, identical or corresponding elements are given same reference numerals. It should be noted that the drawings show schematic examples. Accordingly, a relationship between respective elements may be different from real values. Among the drawings, there may be parts where the relationships and ratios of the shown sizes are different from one another.

When the glass particles were deposited from outside the disposed core preforms to form the cladding like the production method of the multi-core fiber preform described in Patent Literature 3, gaps among the core preforms may not be buried sufficiently sometimes. In such a case, even though being sintered thereafter, the multi-core fiber preform is subjected to deformation or strain along with a large gap produced in a region surrounded by the cores or with the gap being buried at the sintering, and thus a problem occurred sometimes that the preform cracked or accuracy decreases when positioning the core. Moreover, when drawing a multi-core fiber from the multi-core fiber preform, the multi-core fiber is subjected to decrease in quality such as a gap produced in the optical fiber or decrease in accuracy for positioning the core, or the like sometimes.

In contrast, the embodiment described below is capable of prevent a gap from being produced in the cladding and increase accuracy for positioning the core, a multi-core fiber preform and a multi-core fiber can be produced at a low cost and in good quality.

First Embodiment

At first, a multi-core fiber preform 1 produced by a production method of a multi-core fiber preform (optical fiber preform) according to a first embodiment of the present invention will be explained. As shown in FIG. 1, the multi-core fiber preform 1 includes a plurality of core portions 10 and a cladding portion 13 formed at outer peripheries of the core portions 10.

The plurality of core portions 10 are configured by a center core portion 11 disposed at the center axis of the multi-core fiber preform 1 and a plurality of outer core portions 12 disposed at an outer periphery of the center core portion 11. Each of the core portions 10 is configured by silica-based glass being doped with, for example, germanium or the like and having an increased refractive index.

The cladding portion 13 is configured by a material, having a refractive index lower than that of the core, such as pure silica glass which is not doped with a dopant for adjusting refractive index, for example.

Hereafter, the production method of the multi-core fiber preform 1 and the production method of the multi-core fiber according to the first embodiment of the present invention will be explained.

Figure 2:
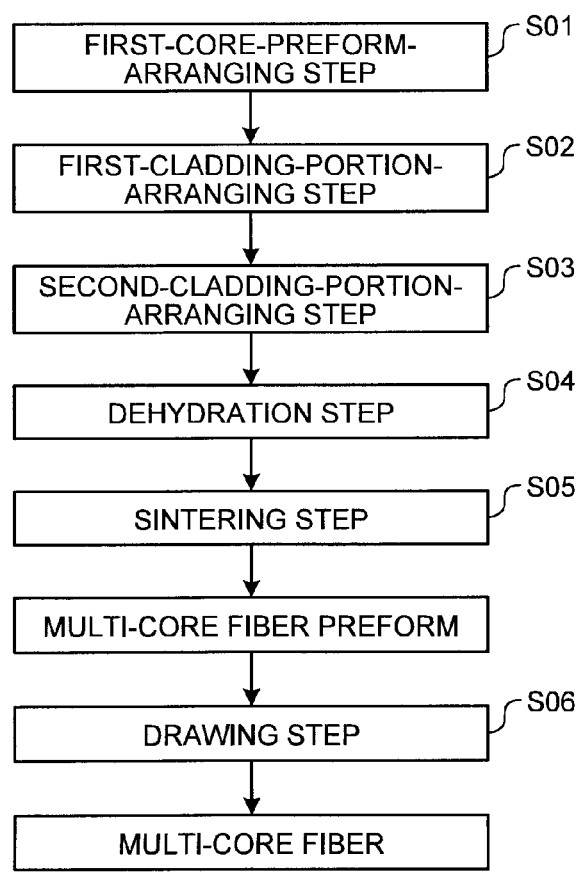
FIG. 2 is a flowchart for the production method of the multi-core fiber preform according to the first embodiment of the present invention.

For example, as shown in FIG. 2, the production method of the multi-core fiber preform 1 according to the first embodiment includes first-core-preform-arranging step S01, first-cladding-portion-arranging step S02, second-cladding-portion-arranging step S03, dehydration step S04, and sintering step S05. Herein the first-core-preform-arranging step S01 and the first-cladding-portion-arranging step S02 constitute a first-preform-preparing step.

Hereafter, each step will be explained in detail.

(First-Core-Preform-Arranging Step S01)

Figure 3A:
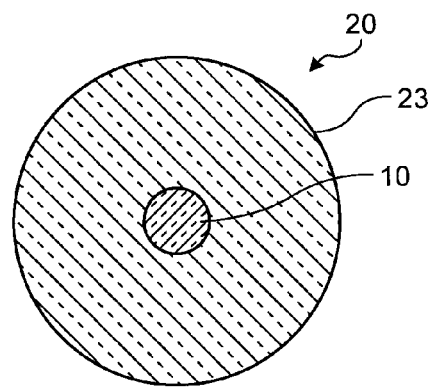
FIG. 3A is a schematic view showing a cross section of a core preform for use in the production method of the multi-core fiber preform according to the first embodiment of the present invention.
Figure 3B:
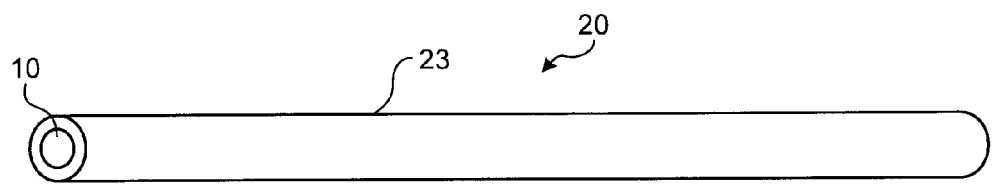
FIG. 3B is a schematic view showing entirely the core preform for use in the production method of the multi-core fiber preform according to the first embodiment of the present invention.

As shown in FIGS. 3A and 3B, a core preform 20 as a first glass preform is configured by a core portion 10 becoming a core portion of the optical fiber preform and a cladding portion 23 formed to surround the core portion 10, and is columnar-shaped and extending unidirectionally. The cladding portion 23 is a portion becoming a part of the cladding portion 13 of the multi-core fiber preform 1, and is configured with, for example, a material that is the same as that of the cladding portion 13, a material having a refractive index that is the same as that of the cladding portion 13, or a material having a refractive index that is lower than that of the cladding portion 13. The core preform 20 can be produced by a known method such as Vapor Phase Axial Deposition (VAD) method, Outside Vapor Deposition (OVD) method, and Modified Chemical Vapor Deposition (MCVD) method.

Figure 4A:
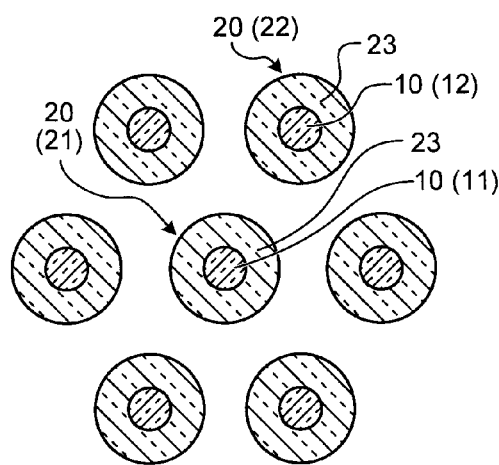
FIG. 4A is a schematic and cross-sectional view explaining arrangement of a plurality of core preforms in a first-core-preform-arranging step.

As shown in FIG. 4A, the first-core-preform-arranging step S01 conducts a center-glass-preform-arranging step in which a center core preform 21 as a center glass preform as one of the glass preforms at a position corresponding to the center axis of the multi-core fiber preform 1, and an outer-periphery-glass-preform-arranging step in which outer core preforms 22 as outer periphery glass preforms as at least another one of the glass preforms at an outer periphery side of the center core preform 21. The outer core preforms 22 are disposed so that, for example, the distances from the center core preform 21 are equidistant, and so that distances between adjacent outer core preforms 22 are equidistant. Moreover, it is preferable that the distance between the center core preform 21 and the outer core preforms 22 in this state be determined in consideration of contraction of volume in a sintering step which will be described later.

Figure 4B:
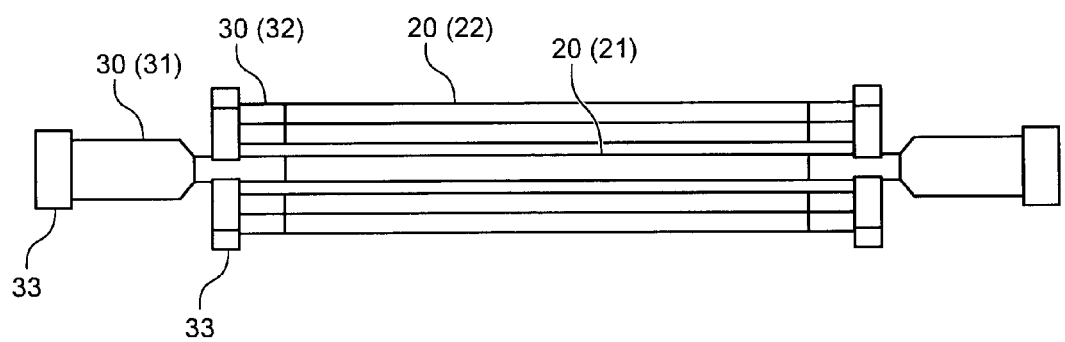
FIG. 4B is a schematic view explaining the arrangement of the plurality of core preforms in the first-core-preform-arranging step.
Figure 4C:
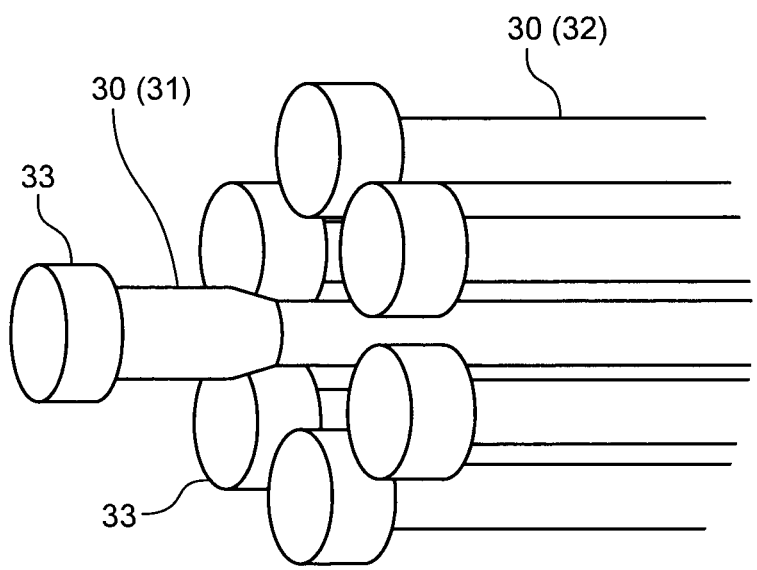
FIG. 4C is a schematic view showing a dummy preform and a holder.

As shown in FIGS. 4B and 4C, it is preferable that dummy preforms 30 made of glass be melt-bonded at both end portions of the core preforms 20. Hereby, in a case where the core preforms 20 are held by a holder of a preform-producing apparatus, which will be explained later, the portion of the dummy preform 30 can be held, and thus, a fine quality part of the core preforms 20 can be used more effectively.

It is preferable that a dummy preform 31 of the core preform 20 (center core preform 21) disposed at a position corresponding to the center axis of the multi-core fiber preform 1 be greater in length and in diameter than those of dummy preforms 32 of the core preforms 20 (outer core preforms 22) disposed at an outer periphery of the center core preform 21. Hereby, it is easy to hold only the dummy preform 31 of the center core preform 21 in later steps, and thus, the entire multi-core fiber preform 1 can be held by holding only the dummy preform 31 of the center core preform 21.

The core preform 20 is attached to a holder 33 of the preform-producing apparatus. Hereby, the core preforms 20 are disposed at predetermined positions. In this state, the holder 33 holds the portion of the dummy preform 30 of the core preform 20.

The holder 33 is capable of maintaining a relationship among the disposed core preforms 20 and rotating (revolving) all of the core preforms 20 around the center axis of the center core preform 21. The holder 33 may be configured to be capable of rotating (spinning) each core preform 20 around its own axis. For a material of the holder 33, metal, Teflon (registered trademark) or the like can be used.

(First-Cladding-Portion-Arranging Step S02)

Figure 5A:
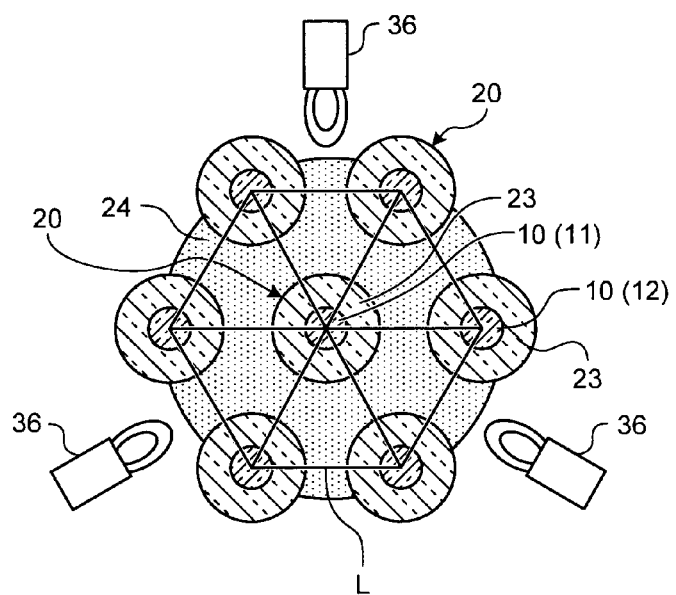
FIG. 5A is a schematic view explaining a first-cladding-portion-arranging step.
Figure 5B:
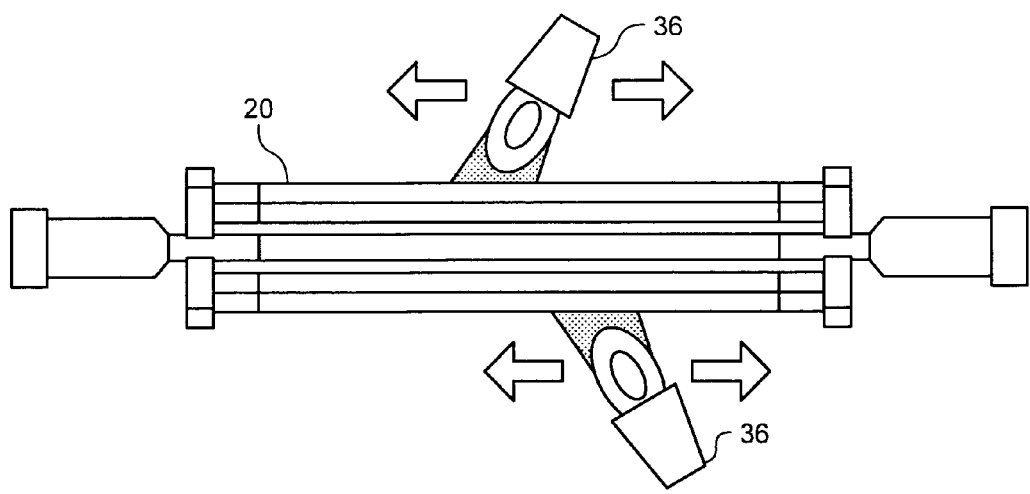
FIG. 5B is a schematic view explaining the first-cladding-portion-arranging step.

Then, a first cladding portion 24 is disposed by forming the first cladding portion 24 to bury a gap among the respective core preforms 20 disposed as described above. As shown in FIGS. 5A and 5B, in the first embodiment, the first cladding portion 24 is formed by depositing glass particles around the core preforms 20 (particularly the center core preform 21) by using a glass-particle-feeding unit provided to the preform-producing apparatus.

In the present embodiment, the glass-particle-feeding unit not shown in the drawings feeds burners 36 for synthesizing the glass particles, $H_2$ gas as a glass material gas and $O_2$ gas as a combustion gas. The burners 36 eject them. For glass material gas, for example, $SiCl_4$ gas or the like can be used.

The burners 36 cause the glass material gas to be subjected to flame hydrolysis in a flame formed by the combustion gas to synthesize the glass particles. As shown in FIG. 5A, in the present embodiment, the glass particles are deposited from the gaps among the adjacent outer core preforms 22 to bury gaps among the core preforms 20, thereby to form the first cladding portion 24 made of the glass particles. In this state, the first cladding portion 24 is formed so that lines L connecting the centers of the core preforms 20 are covered entirely. Hereby, the first cladding portion 24 is disposed.

Moreover, as shown in FIG. 5B, the burner 36 and the core preforms 20 are capable of reciprocating movement with each other in a direction in which the core preforms 20 extend, thereby the glass particles can be deposited uniformly in the direction in which the core preforms 20 extend. Although the glass particles are deposited by moving the burner 36 in the present embodiment, the core preform 20 may be moved reciprocally while the burner 36 is fixed. Moreover, the burner 36 is disposed to be capable of moving forward and backward in a direction orthogonal to the axis of the center core preform 21.

Herein, in order to bury the gap among the core preforms 20 more uniformly, it is preferable that the glass particles be deposited by the same amounts from among all of the adjacent outer core preforms 22. Therefore, in a case where there are six outer core preforms 22 and three burners 36 like the present embodiment, the burners 36 are moved reciprocally by predetermined times, and then, all of the core preforms 20 are rotated (revolved) by 60° around the center axis of the center core preform 21 and then the burners 36 are moved between other adjacent outer core preforms 22 and moved reciprocally by predetermined times, to deposit the glass particles. It is preferable that the first cladding portion 24 be formed by repeating these operations.

If one point in the extending direction of the core preform 20 is heated by a plurality of burners, a problem occurs sometimes that temperature of the heated point is too high to cause deformation or the like of the center core preform 21. Therefore, in a case where a plurality of burners are used like the present embodiment, it is preferable that the burners 36 be moved reciprocally so that each of the burners 36 heat different positions, in the extending direction, of the core preform 20. The number of the burner 36 may be one.

Alternatively, until the first cladding portion 24 is formed, the glass particles may be deposited while the center core preform 21 is rotated (spun) around the axis of the center core preform. Hereby the first cladding portion 24 can be formed uniformly on an outer periphery of the center core preform 21.

Moreover, the glass particles may be deposited while all the core preforms 20 are rotated (spun) around the axes of the core preforms respectively. Hereby it is possible to restrain the gap between the adjacent outer core preforms 22 from being buried by the glass particles while the gap remains at the outer periphery of the center core preform 21.

If a bulk density of the deposited glass particles is low, a contraction of a dehydrating and sintering step, which will be explained later, increases, thus, accuracy of positioning the core may possibly decrease. Therefore, the bulk density may be increased by disposing, in addition to the burner 36, another thermal shrink burner feeding only a combustion gas to shrink the deposited glass particles thermally. A preferable bulk density is equal to or greater than 0.5 $g/cm^3$. It is preferable that the thermal shrink burners be disposed by the same number as those of the burners 36 feeding the glass material. The thermal shrink burners may be disposed so that same number of the burners 36 and the core preform 20, in a direction in which both of them extend, are heated from gaps among the adjacent outer core preforms 22, or so that the thermal shrink burner heat so as to follow the burners 36 from the gap, that is the same as that of the corresponding burners 36, among the outer core preforms 22.

Hereby the glass particles can be deposited without forming the gap and so that the gap among the core preforms 20 are buried.

Moreover, it is preferable that, as shown in FIG. 5A, equal to or greater then approximately half of the outer core preforms 22 in this state be buried in the first cladding portion 24 so that the lines L connecting the centers of the outer core preforms 22 are covered entirely. Hereby the glass particles can be deposited without forming a gap in a second-cladding-portion-arranging step which will be explained next.

A first preform having core preforms 20 as a plurality of glass preforms and a first cladding portion 24 disposed among the core preforms 20 are prepared by the first-core-preform-arranging step S01 and the first-cladding-portion-arranging step S02. In this state, it is preferable that the first cladding portion 24 be disposed so that the cross section of the first preform (see FIG. 5A) is close to a round shape. Hereby a cross section of a porous preform 38 being formed thereafter is easy to be round-shaped.

(Second-Cladding-Portion-Arranging Step S03)

Figure 6:
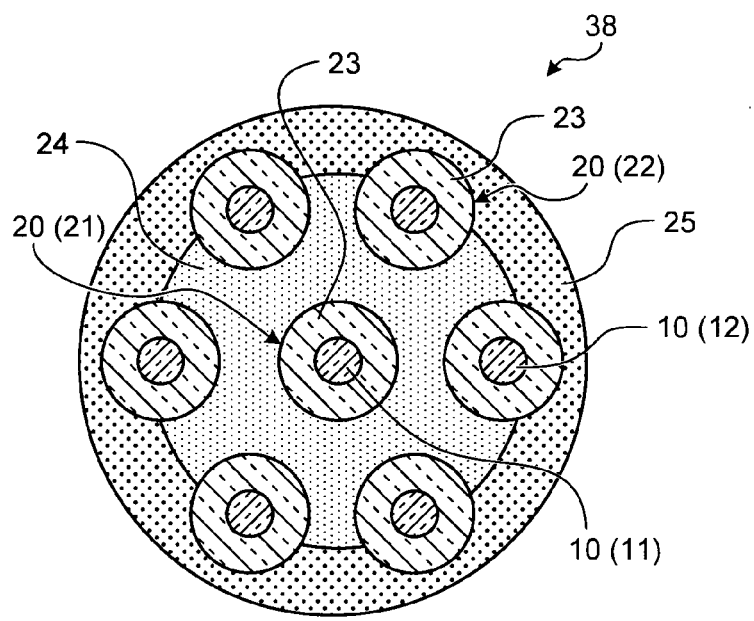
FIG. 6 is a schematic view explaining a second-cladding-portion-arranging step.

Then, as shown in FIG. 6, after forming the first cladding portion 24, the glass particles are deposited to surround the outer core preforms 22 and the first cladding portion 24 of the first preform to form the second cladding portion 25. In this state, similarly to the case of FIG. 5B, the material gas and the combustion gas are ejected from the burners to produce the glass particles, the first preform and the burners are moved relative to each other in the longitudinal direction of the first preform to deposit the glass particles on the first preform. Hereby, the second cladding portion 25 is disposed, and thus, the porous preform 38 as the base preform for the multi-core fiber preform 1 is formed.

Figure 7:
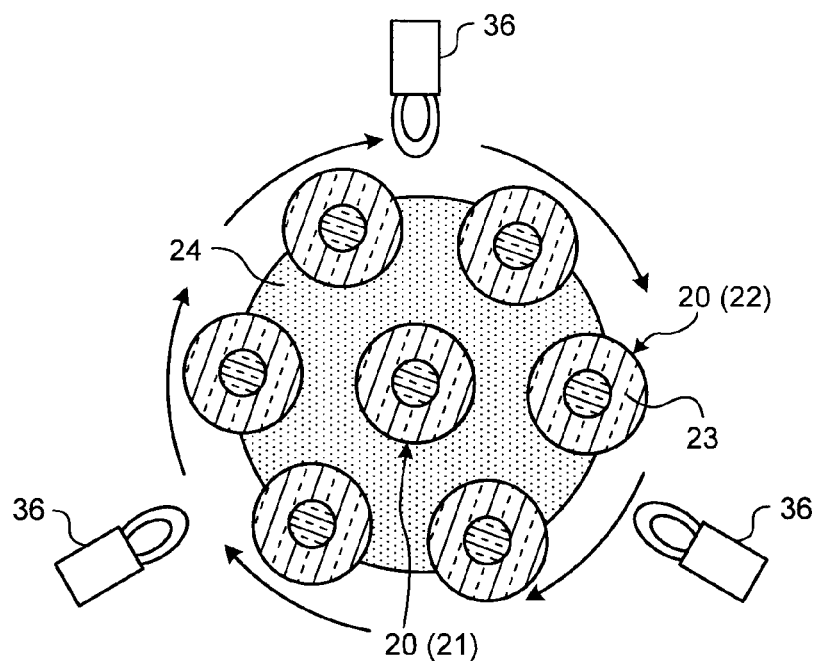
FIG. 7 is a schematic view explaining the second-cladding-portion-arranging step.

Herein, when forming the second cladding portion 25, it is preferable that, as shown in FIG. 7, the glass particles be deposited while rotating the core preforms 20 around the center axis of the center core preform 21.

After the second cladding portion 25 is formed, a milling operation may be conducted to the second cladding portion 25 so that its cross section becomes a round shape close to a perfect circle.

(Dehydration Step S04, Sintering Step S05)

Figure 8:
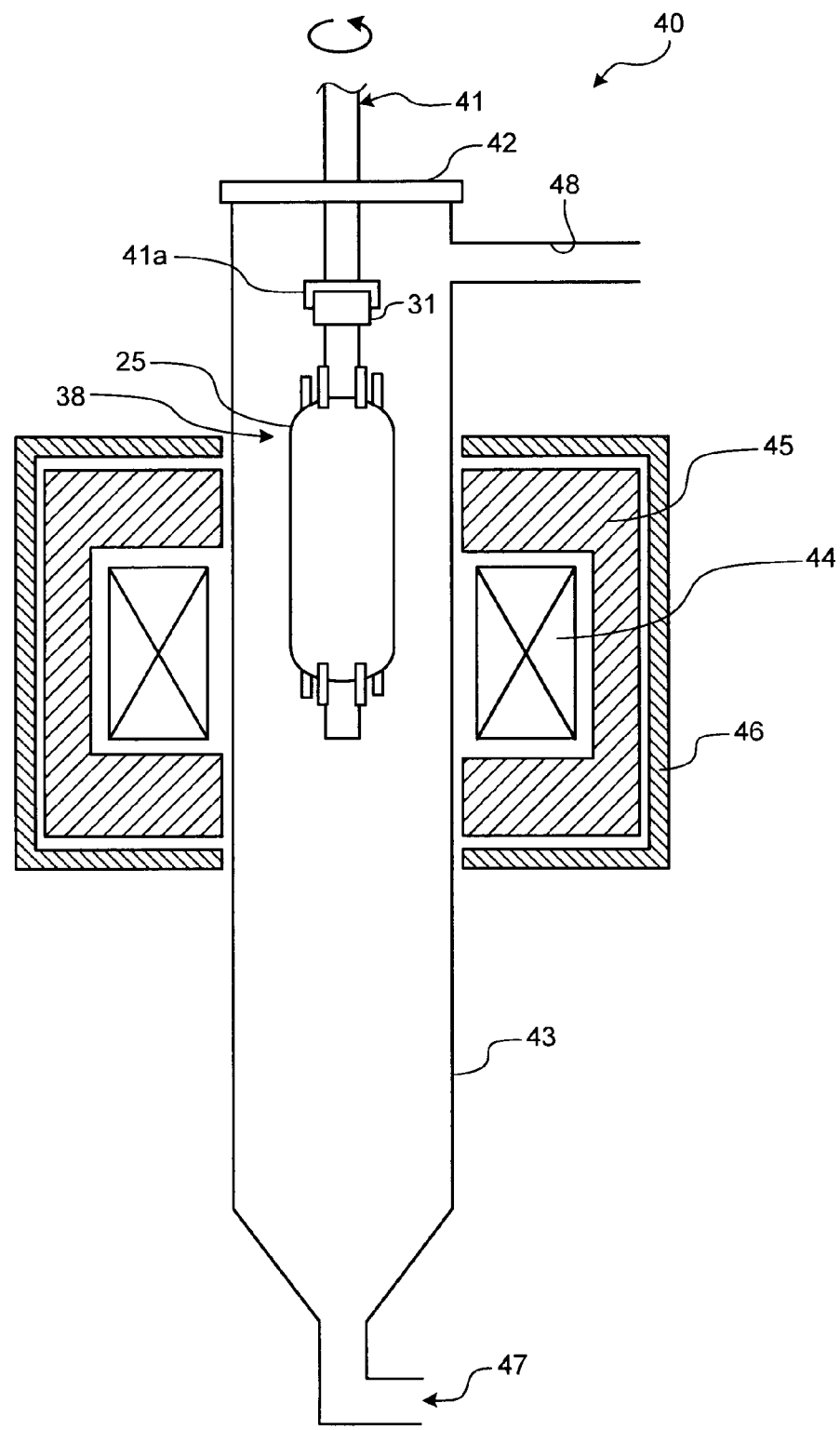
FIG. 8 is a schematic view explaining an electric furnace for use in a dehydration step and a sintering step.

Then, the dehydration step S04 and the sintering step S05 are conducted. FIG. 8 is a schematic view explaining an electric furnace 40 for use in the dehydration step S04 and the sintering step S05. The dehydration step S04 and the sintering step S05 are conducted as follows.

The electric furnace 40 is provided with a rotation-and-lifting mechanism 41 having a holding unit 41a for holding the porous preform 38, a furnace core tube 43 made of silica glass for enclosing an object, an upper lid 42 for the furnace core tube 43, a heater 44 being provided at an outer periphery of the furnace core tube 43 and heating the porous preform 38 from outside, and a furnace body 46 enclosing the heater 44 at an outer periphery of the furnace core tube 43 via an insulator 45.

Provided at a lower portion of the furnace core tube 43 is a gas-feeding port 47 for feeding an inert gas such as nitrogen gas and helium gas, and a dehydration gas such as chlorine gas into the furnace core tube 43, and provided at an upper portion of the furnace core tube 43 is a gas-exhausting port 48 for exhausting waste gas to outside the furnace core tube 43.

In the dehydration step S04 and the sintering step S05, a gas necessary for dehydration and sintering such as an inert gas like helium (He) and a dehydration gas such as chlorine gas ($Cl_2$), is introduced into the furnace core tube 43 by predetermined flow amounts and an appropriate amount of gas is exhausted from the gas-exhausting port 48 to maintain a pressure inside the furnace core tube 43.

The porous preform 38, of which dummy preform 31 is melt-bonded to the center core preform 21 is held by the holding unit 41a of the rotation-and-lifting mechanism 41, descends in the furnace core tube 43 while rotating. Hereby, starting from end portion thereof, the porous preform 38 is passed through a portion heated to a high temperature by the heater 44 to be heated and dehydrated. Then, and after temperature is increased, starting from the end portion of the porous preform 38 similarly to the dehydration, the porous preform 38 is sintered by passing through the portion heated to a high temperature. Hereby the first cladding portion 24 and the second cladding portion 25 are vitrified, thus the multi-core fiber preform 1 is obtained.

In this state, the outer core preforms 22 are not held by the holding unit 41a. Therefore, along with the contraction of volume when the deposited glass particles is sintered, the outer core preforms 22 move in a direction toward the center core preform 21 accordingly. Hereby the outer core preforms 22 can be restrained from bending in the longitudinal direction, and the multi-core fiber preform 1 can be obtained with a higher accuracy for positioning the core.

The dehydration step S04 and the sintering step S05 are not limited to the above-described operations, and a known method can be used. For example, an atmosphere for dehydration and sintering may be under reduced pressure, and a heating method may be a soaking method. The dehydration step S04 and the sintering step S05 may be conducted in separated steps.

Although the second-cladding-portion-arranging step S03 is conducted after the first-cladding-portion-arranging step S02 in the present embodiment, a dehydrating/sintering step may be conducted after the first-cladding-portion-arranging step S02 to vitrify the first cladding in advance, and then, the second-cladding-portion-arranging step S03 may be conducted. Hereby vitrification is possible without limiting more of the movement of the outer cores due to the contraction, by sintering, of the volume, thus, the multi-core fiber preform can be obtained with a higher accuracy for positioning the core.

Hereafter, a production method of the multi-core fiber will be explained still more. The production method of the multi-core fiber 5 further includes a drawing step S06.

(Drawing Step S06)

Figure 9:
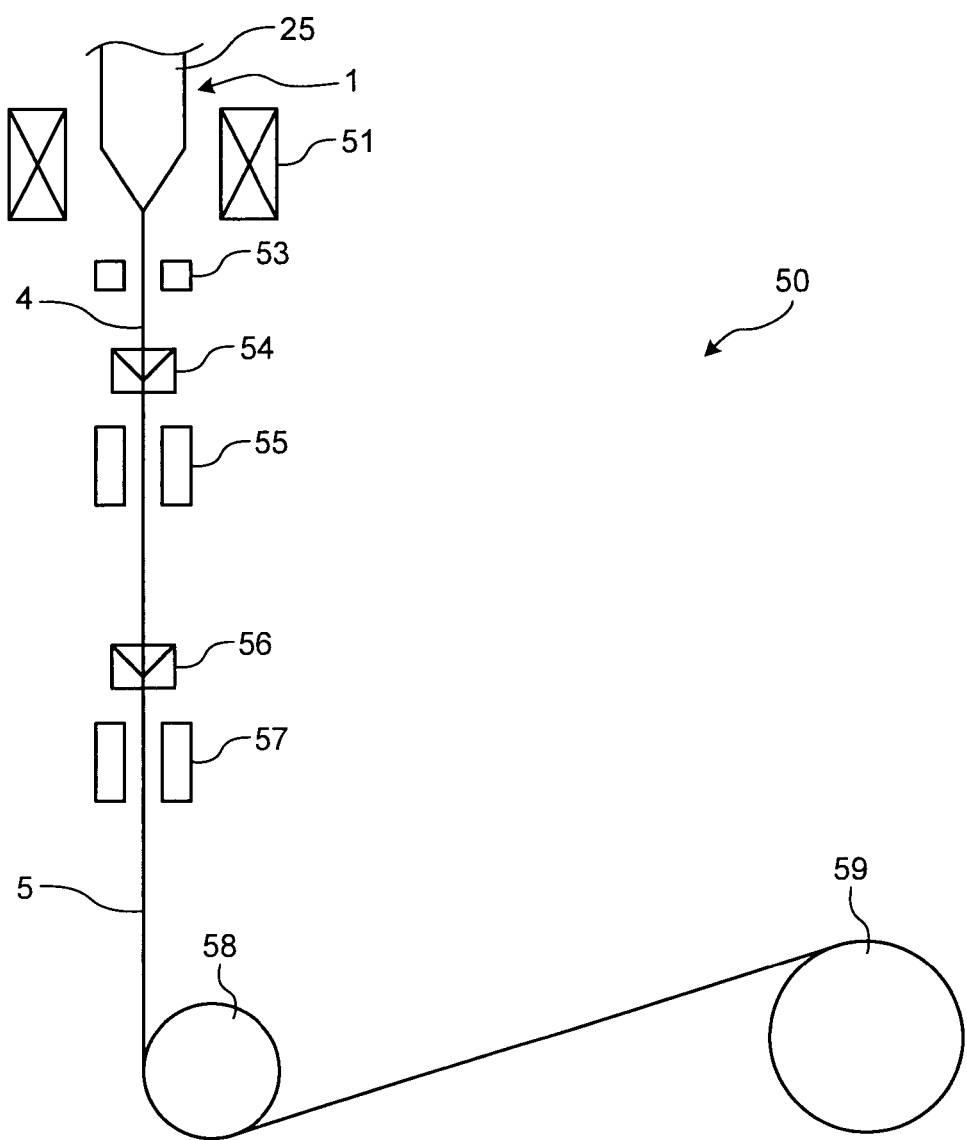
FIG. 9 is a schematic view explaining a drawing apparatus for use in a drawing step.

In the drawing step S06, the produced multi-core fiber preform 1 as described above is drawn. FIG. 9 is a view explaining a drawing apparatus 50 for use in the drawing step S06 in the present embodiment. Hereafter the drawing step S06 will be explained in more detail.

At first, the multi-core fiber preform 1 is disposed in an electric furnace (drawing furnace) of the drawing apparatus 50, an end of the multi-core fiber preform 1 is heated and melted by the heater 51 in the drawing furnace, and then the multi-core fiber 4 is drawn downward in a vertical direction.

Next, while an outer diameter of the drawn multi-core fiber 4 by being heated and melted is monitored by an outer-diameter measurement unit 53, an UV curable resin is applied on a surface of an outer periphery of the multi-core fiber 4 by a coating device 54, and then, an ultraviolet ray is irradiated by an UV irradiation device 55 to cure the applied UV curable resin, thus a coated primary coating layer is obtained.

Next, an UV curable resin is further applied on the primary coating layer by a coating device 56, and then, an ultraviolet ray is irradiated by an UV irradiation device 57 to cure the applied UV curable resin to form a secondary coating layer, thus the multi-core fiber 5 is coated. An outer-diameter measurement unit not shown in the drawings may be disposed after applying each UV curable resin. The number of the coating layers to be formed is adjusted appropriately in accordance with a purpose of usage of the multi-core fiber 5 or the like, and the coating devices, the UV irradiation devices, and the outer-diameter measurement units are disposed by the number corresponding to the number of the coating layers. Moreover, a method may be used that applies, and cure, a plurality of coating layers all together.

Next, a guide roller 58 introduces the multi-core fiber 5 on which a coating layer is formed to a winder 59, and the winder 59 winds the multi-core fiber 5 with its bobbin. As described above, the multi-core fiber 5 having the coating layer is produced.

Since the production method of the multi-core fiber preform 1 according to the first embodiment conducts the first-preform-preparing step preparing the first preform having the plurality of core preforms 20 and the first cladding portion 24 disposed among the plurality of core preforms 20, gaps among the plurality of core preforms 20 can be buried by the glass particles reliably, thus, the multi-core fiber preform 1 being subjected to fewer gap, inner deformation, or strain (gap or the like if necessary) can be produced in good quality.

Since the multi-core fiber 5 produced by using the multi-core fiber preform 1 is restrained from deformation and strain can be in good quality obtaining good characteristics.

In the production method of the multi-core fiber preform 1 according to the first embodiment, since it is configured that the glass particles are deposited from the gaps among the adjacent outer core preforms 22 in the first-cladding-portion-arranging step S02, the glass particles can bury the gap among the center core preform 21 and the outer core preform 22 and the gap among the adjacent outer core preforms 22 reliably.

Since it is configured that the glass particles are deposited in the second-cladding-portion-arranging step S03, while the center core preform 21 and the outer core preform 22 are rotated around the center axis of the multi-core fiber preform 1, the cross section of the second cladding portion 25 can be formed round more reliably.

Figure 10:
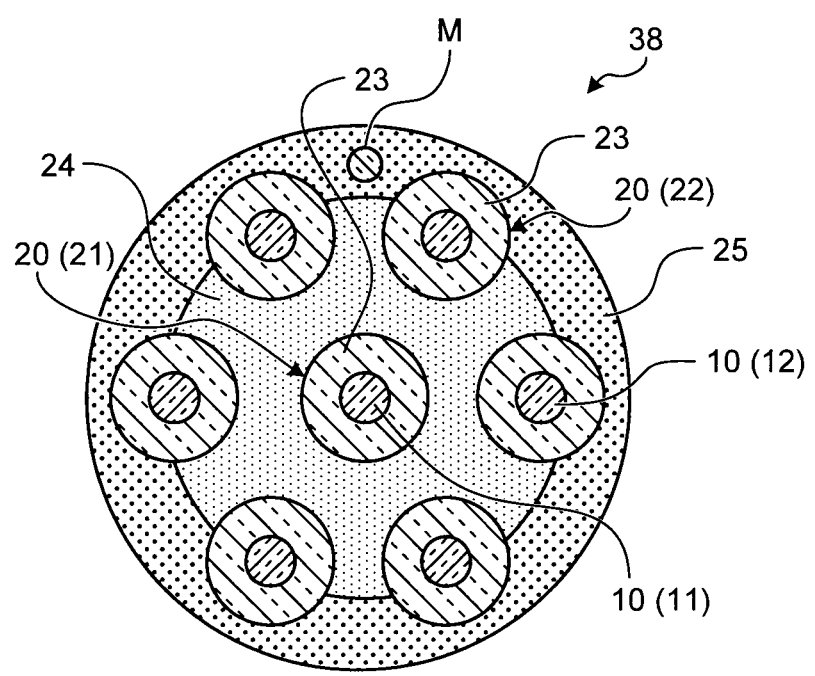
FIG. 10 is a cross-sectional view of a multi-core fiber preform having a marker.

As shown in FIG. 10, it may be configured that, in the second-cladding-portion-arranging step S03, a marker M made of a glass rod is disposed at a position where the second cladding portion 25 is to be formed, and the marker M for identification of the position of the core portion or the like is disposed at the second cladding portion 25. For the marker M, a glass rod made of glass of which refractive index is different from that of the sintered second cladding portion 25 or a glass rod made of colored glass can be used.

Second Embodiment

Hereafter, the production method of the multi-core fiber preform 1 and the production method of the multi-core fiber 5 according to the second embodiment of the present invention will be explained. Elements that are similar to those of the first embodiment are given same reference numerals to omit description in detail.

The production method of the multi-core fiber preform 1 according to the second embodiment is similar to the flow chart shown in FIG. 2 but differs in that, the first-preform-preparing step includes a first-core-preform-arranging step S11 as the first-core-preform-arranging step in place of the first-core-preform-arranging step S01 and a first-cladding-portion-arranging step S12 as the first-cladding-portion-arranging step in place of the first-cladding-portion-arranging step S02. Since the second-cladding-portion-arranging step S03, the dehydration step S04, and the sintering step S05 are configured similarly to those of the production method of the multi-core fiber preform 1 according to the first embodiment, descriptions therefor in detail will be omitted.

(First-Core-Preform-Arranging Step S11)

Figure 11:
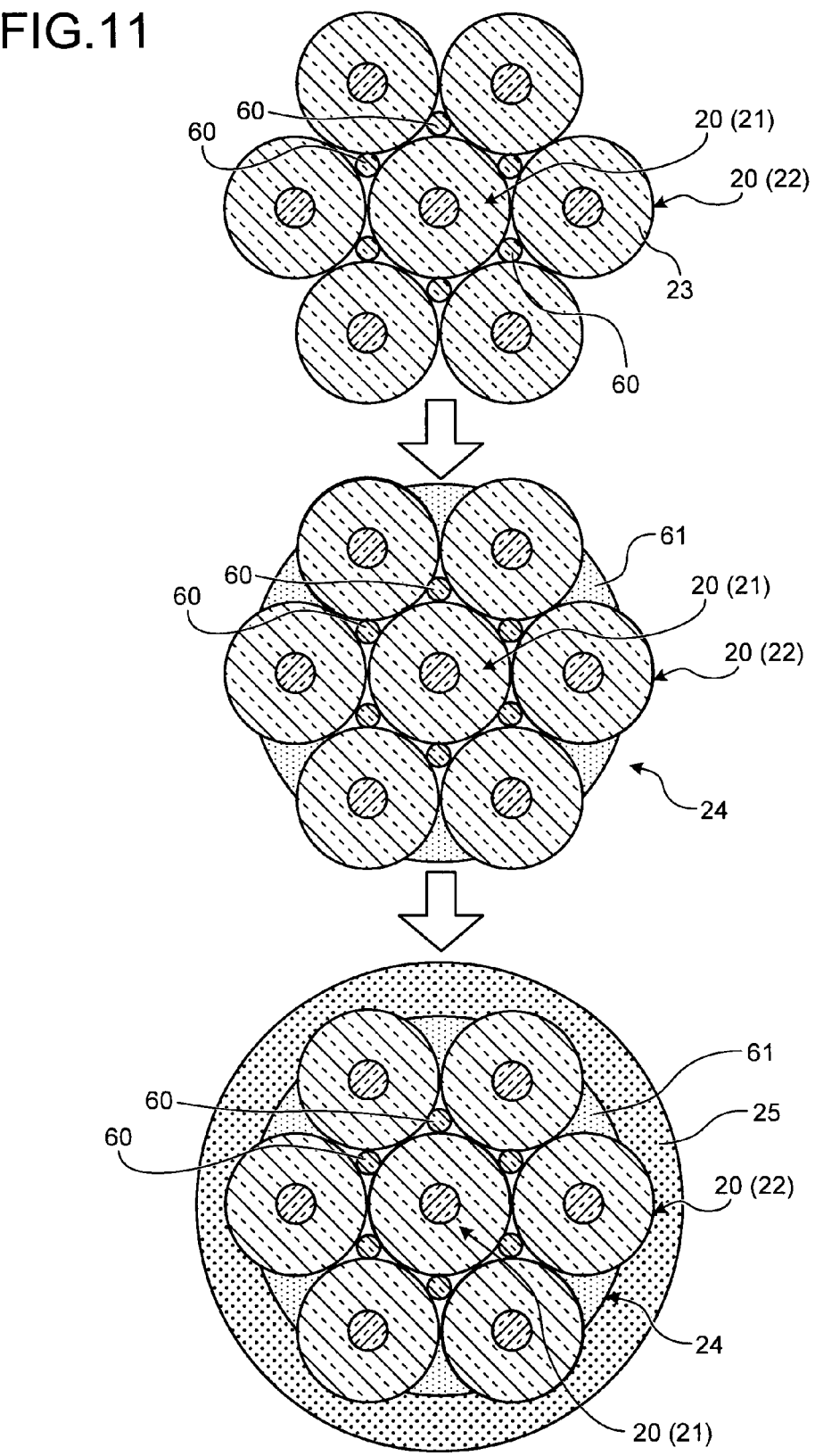
FIG. 11 is a schematic view explaining a production method of a multi-core fiber preform according to a second embodiment of the present invention.

As shown in FIG. 11, in the first-core-preform-arranging step S11, the outer core preform 22s are disposed at an outer periphery of the center core preform 21. Hereby the core preforms 20 are disposed at predetermined positions. In this state, it is preferable that ratios of an outer diameter of the core portion of each of the core preforms 20 and an outer diameter of the cladding portion be adjusted so that, in a chase where the center core preform 21 is disposed to contact the outer core preforms 22, an interval between the cores is of a desirable interval. Hereby each of the core preforms 20 can be disposed stably.

Figure 4D:
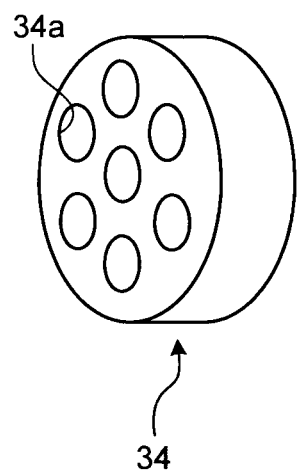
FIG. 4D is a schematic view showing a spacer.

Herein, in this state, it is preferable that spacers (see FIG. 4D) each made of a round disk being provided with through holes shaped approximately the same as that of an outer periphery of the core preform 20 be provided to both end portions of the core preforms 20 disposed at a predetermined position. Hereby each of the core preforms 20 can be disposed more stably. In a case where the spacers made of a material that is the same as that of the cladding portion are used, the spacers do not have to be removed in a later step.

(First-Cladding-Portion-Arranging Step S12)

Hereafter, as shown in FIG. 11, a glass-rod-disposing step is conducted in which a glass rod 60 is disposed in each gap between the center core preform 21 and the outer core preform 22. The glass rod 60 is made of a material that is the same as that of the cladding portion 13 or a material having a refractive index that is the same as that of the cladding portion 13. Moreover, glass particles 61 are deposited so as to bury a gap between the previously described outer core preforms 22 similarly to the first embodiment. Hereby the first cladding portion 24 formed by the glass rods 60 and the glass particles 61 is disposed. Similarly to the previously described configuration, the first cladding portion 24 is disposed so that lines connecting the centers of the core preforms 20 are covered entirely.

Then, similarly to the first embodiment, the second cladding portion 25 is disposed in the second-cladding-portion-arranging step S03. After that, the dehydration step S04 and the sintering step S05 are conducted in this order, thus the multi-core fiber preform 1 according to the second embodiment is produced.

In the present embodiment, since the core preforms 20 made of glass contact to with each other, the outer core preform 22 never moves notwithstanding the contraction of volume when the glass particles 61 are sintered. Therefore, in the second-cladding-portion-arranging step S03, a dummy preform holding the core preforms 20 collectively may be disposed to each of two ends. Hereby, the preform can be held stably in the second-cladding-portion-arranging step S03, the dehydration step S04, and the sintering step S05.

The multi-core fiber 5 is produced by conducting the drawing step S06 using the multi-core fiber preform 1 similarly to the first embodiment.

According to the above-configured production method of the multi-core fiber preform 1 according to the second embodiment of the present invention, since it is configured that the center core preform 21 and the outer core preforms 22 are arranged in the first-core-preform-arranging step S11 and the glass rod 60 is arranged to bury each gap between the center core preform 21 and the outer core preform 22, the gap between the center core preform and the outer core preform can be buried by the glass rods 60 reliably, and thus a gap or the like is restrained from being produced in the cladding portion 13 of the multi-core fiber preform 1.

Third Embodiment

Hereafter, the production method of the multi-core fiber preform 1 and the production method of the multi-core fiber 5 according to the third embodiment of the present invention will be explained. Elements that are similar to those of the first embodiment are given same reference numerals to omit description in detail.

Figure 12:
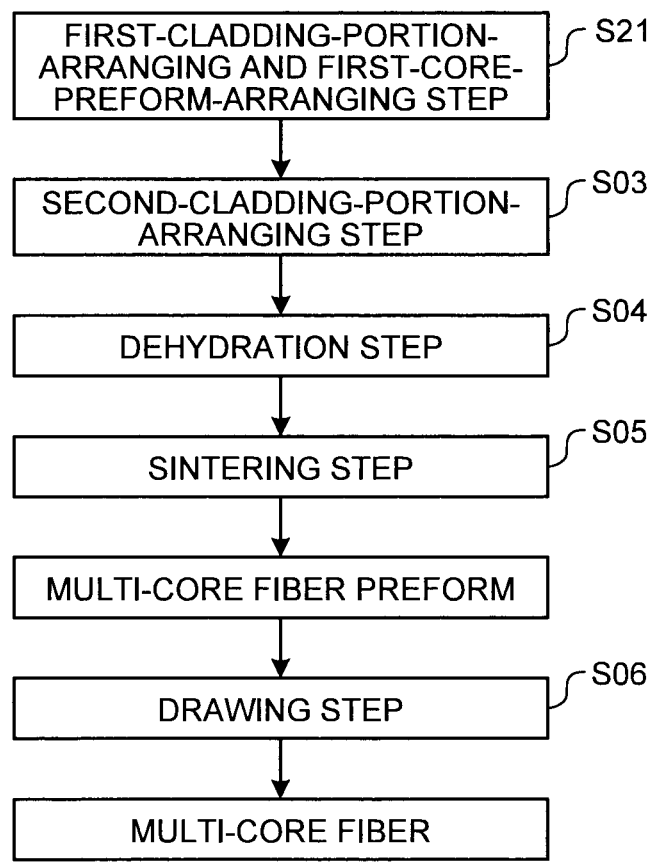
FIG. 12 is a flowchart for a production method of a multi-core fiber preform according to a third embodiment of the present invention.

As shown in FIG. 12, the production method of the multi-core fiber preform 1 according to the third embodiment includes a first-cladding-portion-arranging and first-core-preform-arranging step S21, the second-cladding-portion-arranging step S03, the dehydration step S04, and the sintering step S05. Since the configurations of the second-cladding-portion-arranging step S03, the dehydration step S04, and the sintering step S05 are similar to those of the first embodiment, descriptions in detail therefor will be omitted.

(First-Cladding-Portion-Arranging and First-Core-Preform-Arranging Step S21)

Figure 13:
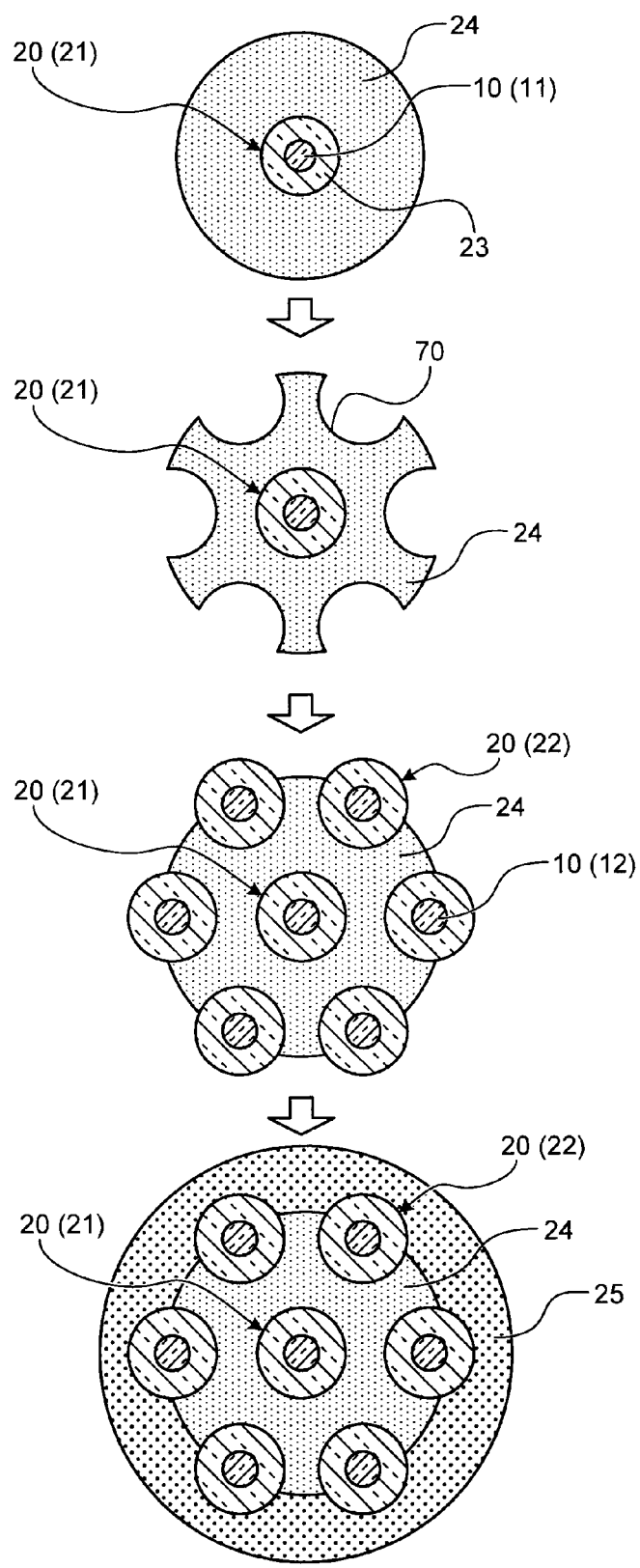
FIG. 13 is a schematic view explaining the production method of the multi-core fiber preform according to the third embodiment of the present invention.

In the production method of the multi-core fiber preform 1 according to the third embodiment, a center-glass-preform-arranging step of the first-core-preform-arranging step is conducted at first, and then the first-cladding-portion-arranging step is conducted, and after that, the outer-glass-preform-arranging step is conducted. That is, as shown in FIG. 13, a core preform 20 (center core preform 21) is arranged at first. After that, glass particles are deposited to the center core preform 21 to surround the center core preform 21 to form the first cladding portion 24. In this state, similarly to the case of FIG. 5B, the material gas and the combustion gas are ejected from the burner to produce the glass particles, and the center core preform 21 and the burner are moved relative to each other in the longitudinal direction of the center core preform 21 to deposit the glass particles on the center core preform 21. After that, recessed portions 70 corresponding to the shape of the outer core preform 22 are formed at predetermined positions (where the outer core preforms 22 are disposed) of the first cladding portion 24 by a milling operation (recessed-portion-forming step).

In this state, it is preferable that a distance between the center core preform 21 and the outer core preform 22 be determined in consideration of contraction of volume in a sintering step which will be described later.

Alternatively, the recessed portions 70 may be formed by, forming the first cladding portion 24, dehydrating the first cladding portion 24, making the first cladding portion 24 be vitrified to a degree that bubbles remain therein (semi-sintered-glass state or translucent-glass state) or making the first cladding portion 24 be vitrified to a degree that bubbles disappear, and then conducting a milling operation. Hereby, since the first cladding portion 24 made of semi-sintered glass is of a hardness suitable for milling, a milling operation is easy, and thus, forming of the recessed portions 70 can be facilitated.

After that, an outer-glass-preform-arranging step is conducted. That is, the outer core preforms 22 are disposed at positions where the recessed portions 70 are formed on the first cladding portion 24. Hereby, the outer core preforms 22 are disposed at predetermined positions. In this case, the first cladding portion 24 may be also disposed so that the lines connecting the centers of the core preform 20 are covered entirely.

(Second-Cladding-Portion-Arranging Step S03)

After that, similarly to the second-cladding-portion-arranging step S03 of the first embodiment, the glass particles are deposited so as to surround the outer core preforms 22 and the first cladding portion 24 to form the second cladding portion 25.

Then, the dehydration step S04 and the sintering step S05 are conducted in this order to produce the multi-core fiber preform 1 according to the third embodiment.

Then, the drawing step S06 is conducted by using the multi-core fiber preform 1 similarly to the first embodiment to produce the multi-core fiber 5.

According to the production method of the multi-core fiber preform 1 according to the above-configured third embodiment of the present invention, since the recessed portions 70 for making the first cladding portion 24 contain the outer core preforms 22 are provided in the first-cladding-portion-arranging step, the gap between the center core preform 21 and the outer core preform 22 can be buried reliably.

Figure 14:
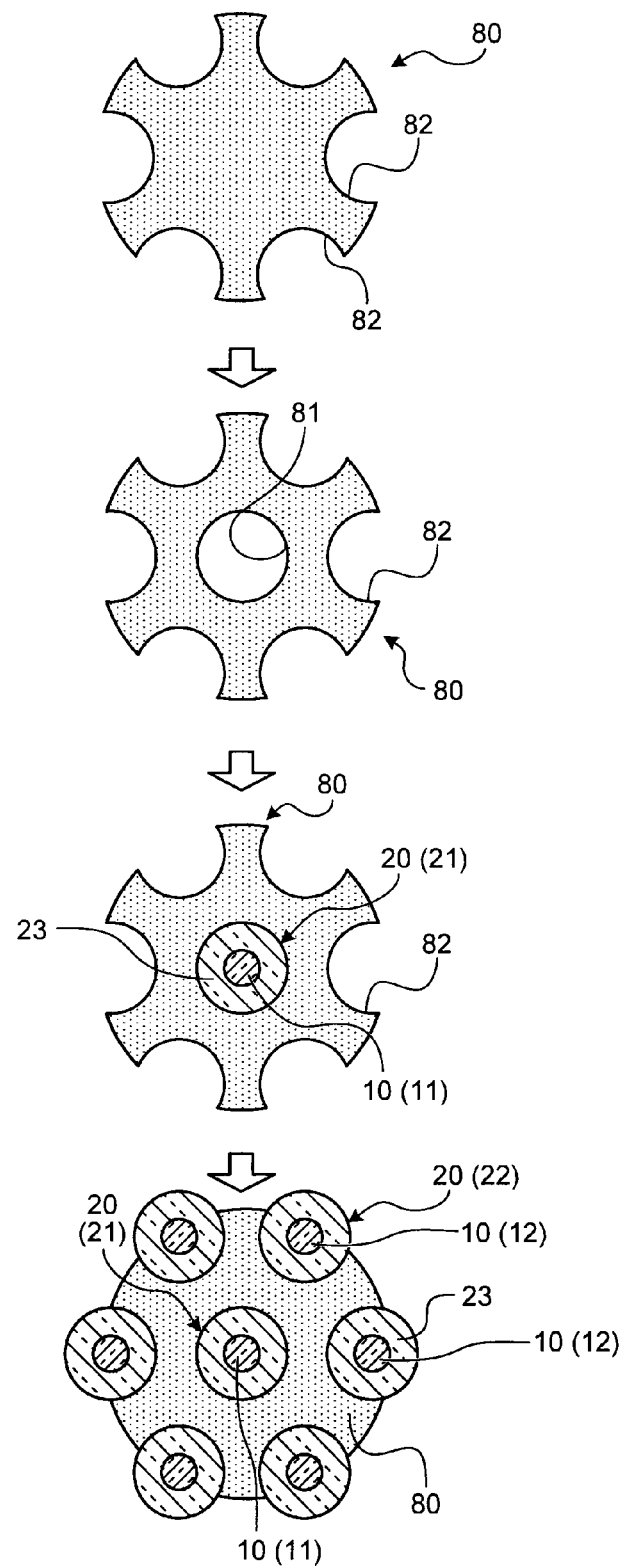
FIG. 14 is a view showing a modified example of the production method of the multi-core fiber preform according to the third embodiment of the present invention.
Figure 15:
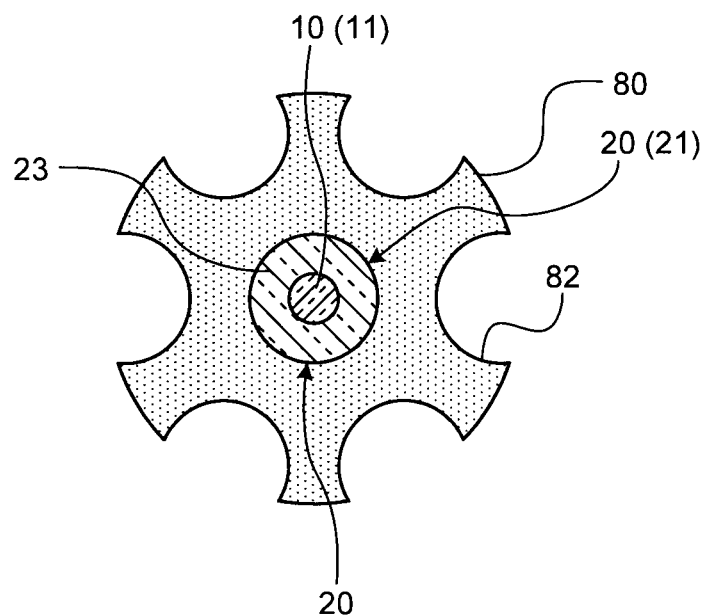
FIG. 15 is a view showing the modified example of the production method of the multi-core fiber preform according to the third embodiment of the present invention.

Although a case, where the glass particles deposited around the center core preform 21 are subjected to a milling operation to form the recessed portions 70 in the first-cladding-portion-arranging step, is described for the third embodiment, it may be configured that, as shown in FIG. 14, for example, a shaped silica body 80 is produced which is a columnar-shaped member made of a material that is the same as that of, or the same refractive index as that of, the cladding portion 13 in which the recessed portions 82 are formed corresponding to the shape of the core preform 20 by a powder compact method described in, for example, Japanese Patent Application Laid-open Publication No. H8-51139 or the like, then a through hole 81 is formed in the center, and then, the center core preform 21 and the outer core preforms 22 are disposed at predetermined positions. Alternatively, as shown in FIG. 15, it may be configured that the center core preform 21 is disposed in the center of the shaped silica body 80 in advance when forming the shaped silica body 80.

Figure 16:
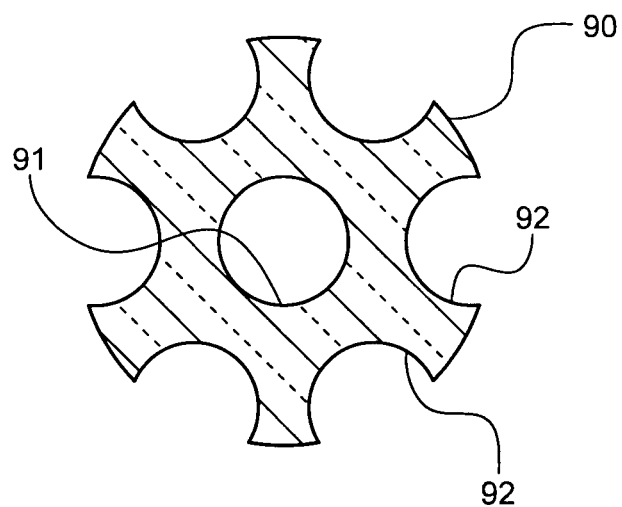
FIG. 16 is a view showing the modified example of the production method of the multi-core fiber preform according to the third embodiment of the present invention.

Alternatively, as shown in FIG. 16, a silica glass member 90 may be used which is a columnar-shaped member having a through hole 91 and recessed portions 92 made of a material that is the same material as, or is of the same refractive index as, that of the cladding portion 13, the through hole 91 and the recessed portions 92 being corresponding to the shape of the core preform 20.

In a case where the silica glass member 90 is used, it is preferable that, similarly to the second embodiment, a spacer made of a material that is the same as that of the cladding portion be used, and it may be configured that, in the second-cladding-portion-arranging step S03, a dummy preform holding the core preforms 20 collectively is disposed at each end.

Figure 17:
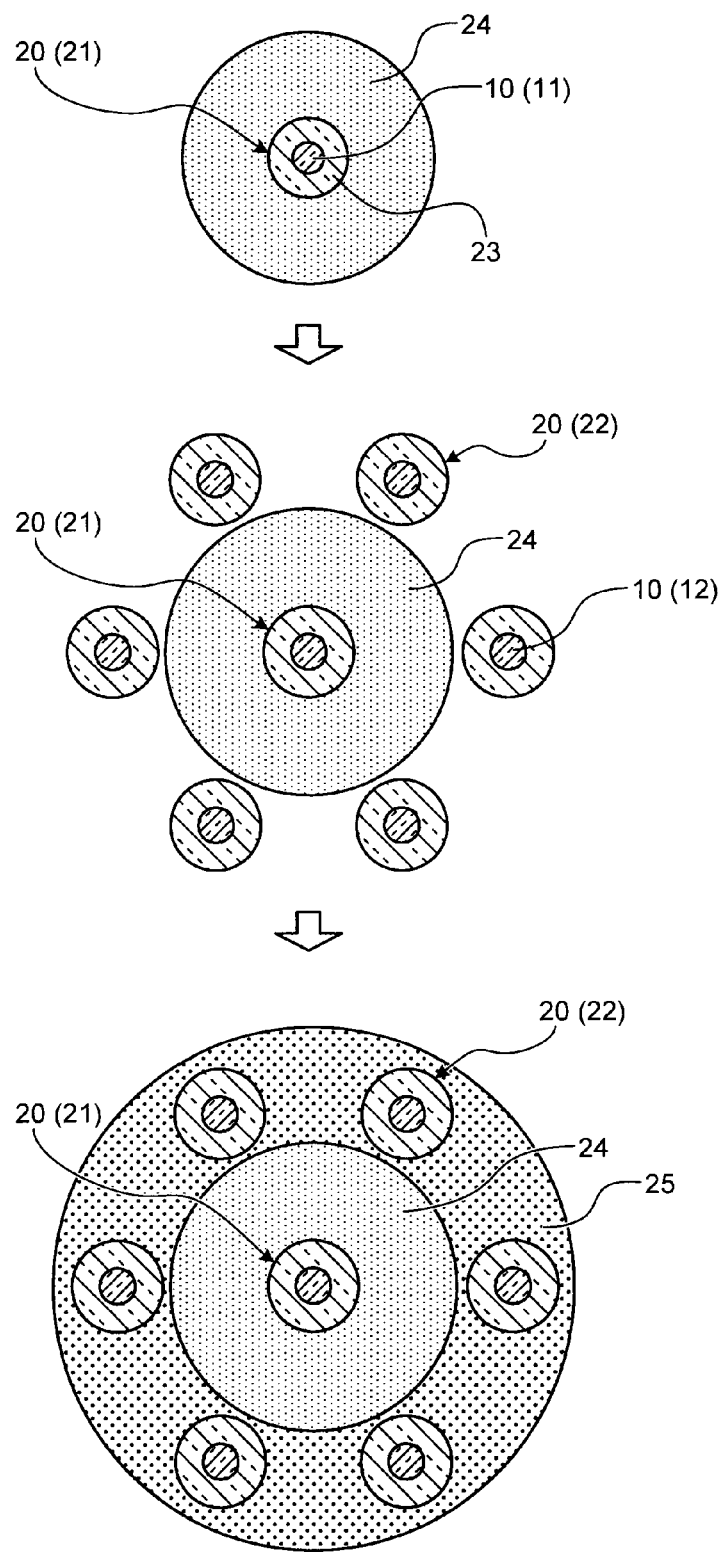
FIG. 17 is a view showing the modified example of the production method of the multi-core fiber preform according to the third embodiment of the present invention.

The first-cladding-portion-arranging and first-core-preform-arranging, and the second cladding portion arranging may be conducted as shown in FIG. 17. At first, a core preform 20 (center core preform 21) is disposed, and the glass particles are deposited on the center core preform 21 to surround the center core preform 21, then, the first cladding portion 24 is formed. After that, the outer core preforms 22 are disposed to circumscribe, or to have a slight space relative to, an outer periphery of the first cladding portion 24. Moreover, the glass particles are deposited to surround the outer core preforms 22 and the first cladding portion 24 to form the second cladding portion 25. It is preferable that, the outer core preforms 22 be disposed after forming the first cladding portion 24 and then making the first cladding portion 24 in a semi-sintered-glass state or a vitrified state. Hereby, since the hardness of the core preform 20 increases, the first cladding portion 24 is prevented from being cracked even in a case where the outer core preform 22 being disposed contacts the first cladding portion 24. Instead of making the first cladding portion 24 in the semi-sintered-glass state or the vitrified glass state, the density of only a surface of the outer periphery of the first cladding portion 24 may be increased by shrinking etc. the outer periphery of the first cladding portion 24 thermally by a thermal shrink burner or the like.

Fourth Embodiment

Hereafter, the production method of the multi-core fiber preform 1 and the production method of the multi-core fiber 5 according to the fourth embodiment of the present invention will be explained. Elements that are similar to those of the first embodiment are given same reference numerals to omit description in detail.

Figure 18:
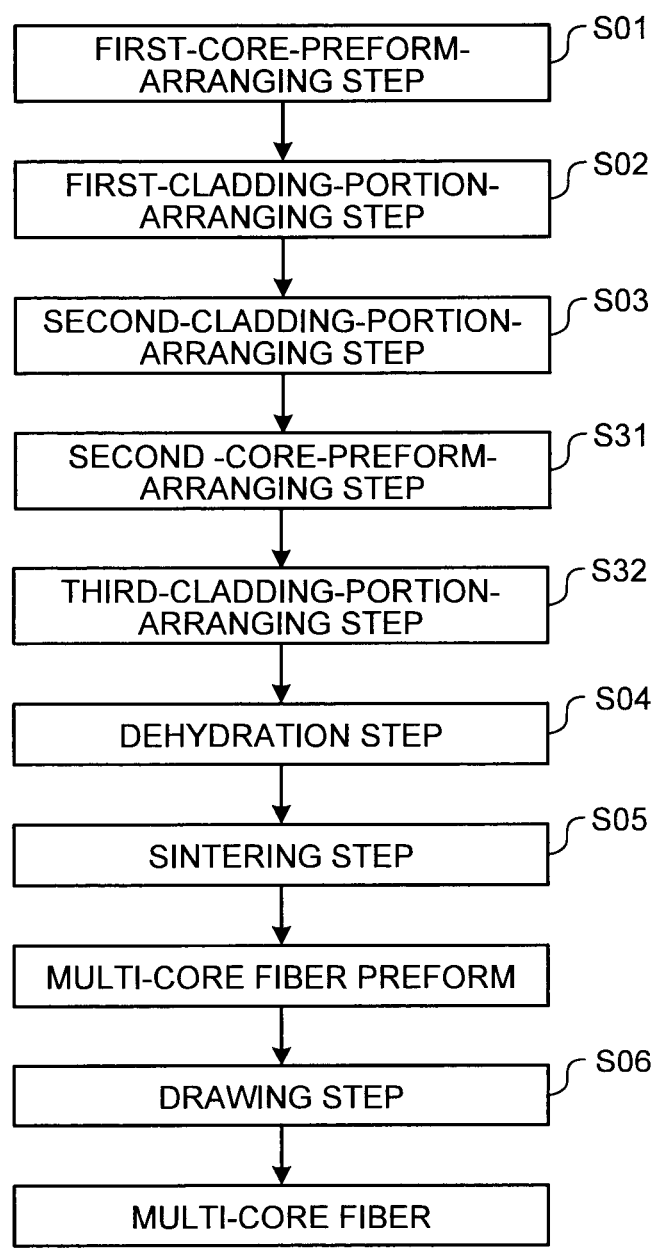
FIG. 18 is a flowchart for a production method of a multi-core fiber preform according to a fourth embodiment of the present invention.

As shown in FIG. 18, the production method of the multi-core fiber preform 1 according to the fourth embodiment includes, for example, the first-core-preform-arranging step S01, the first-cladding-portion-arranging step S02, the second-cladding-portion-arranging step S03, a second-core-preform-arranging step S31 as the second-glass-preform-arranging step, a third-cladding-portion-arranging step S32, the dehydration step S04, and the sintering step S05. Since the first-core-preform-arranging step S01, the first-cladding-portion-arranging step S02, the second-cladding-portion-arranging step S03, the dehydration step S04, and the sintering step S05 are configured similarly to those of the first embodiment, descriptions in detail will be omitted. The first-core-preform-arranging step S01 and the first-cladding-portion-arranging step S02 may be replaced by the first-core-preform-arranging step S11 and the first-cladding-portion-arranging step S12, or the first-cladding-portion-arranging and first-core-preform-arranging step S21.

(Second-Core-Preform-Arranging Step S31)

Figure 19:
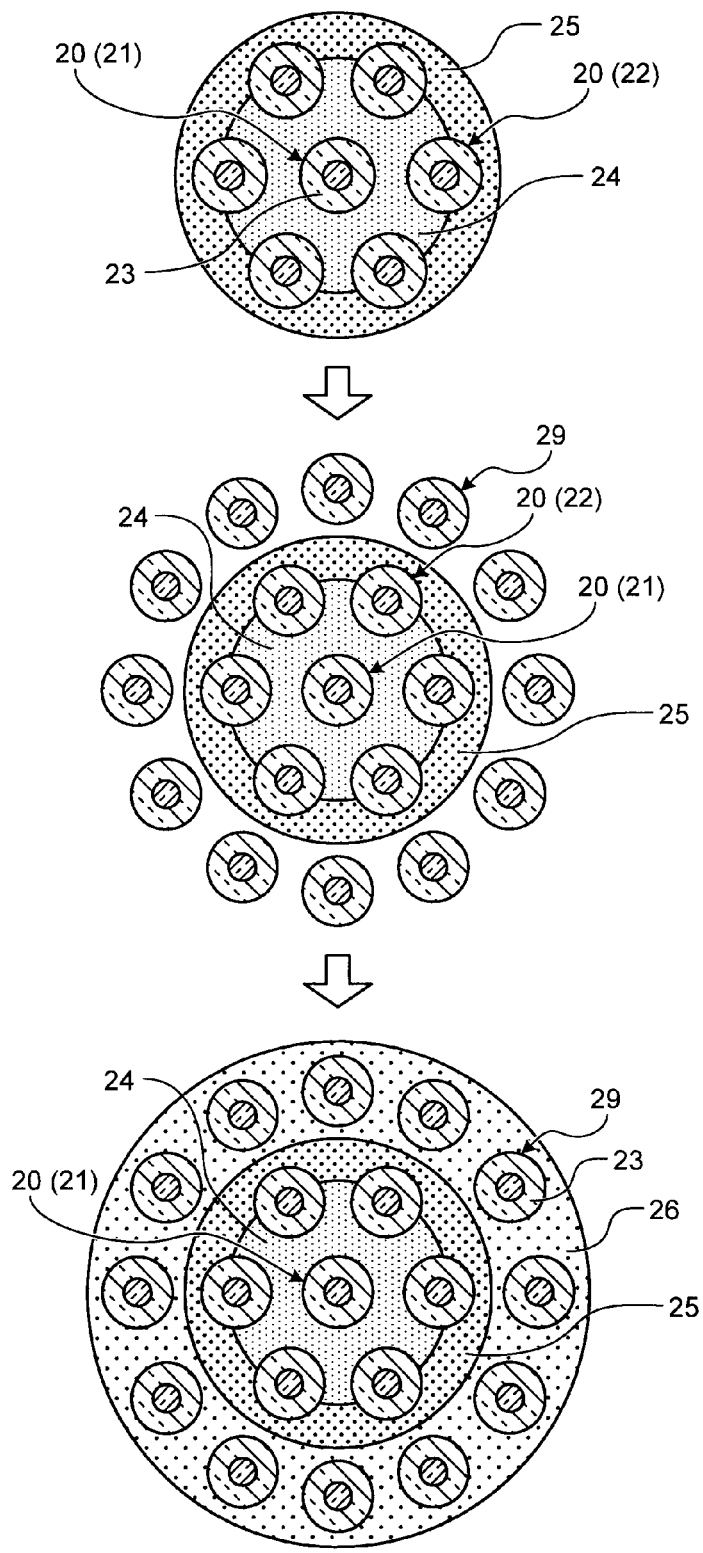
FIG. 19 is a schematic view explaining the production method of the multi-core fiber preform according to the fourth embodiment of the present invention.

After conducting the first-core-preform-arranging step S01, the first-cladding-portion-arranging step S02, and the second-cladding-portion-arranging step S03 in this order, the second-core-preform-arranging step S31 is conducted. As shown in FIG. 19, in the second-core-preform-arranging step S31, at least one second core preform 29 as the second glass preform is disposed at a predetermined position on a side of the outer periphery of the second cladding portion 25. In this state, it is preferable that, in a case of disposing the second cladding portion 25 to contact the second core preform 29, the thickness of the second cladding portion 25 and a ratio between an outer diameter of the core portion and an outer diameter of the cladding portion of the second core preform 29 be adjusted so that intervals among the core preforms becomes desirable. Moreover, it is preferable that the intervals among the core preforms be determined in consideration of contraction of volume of the glass particle being sintered. Hereby, the second core preform 29 can be disposed stably, and a desirable core interval can be obtained.

(Third-Cladding-Portion-Arranging Step S32)

After that, similarly to the second-cladding-portion-arranging step S03, the silica particles are deposited to surround the second cladding portion 25 and the second core preform 29 to form the third cladding portion 26. In this state, similarly to the case of FIG. 5B, the material gas and the combustion gas are ejected from the burners to produce the glass particles, the second cladding portion 25 and the burner are moved relative to each other in the longitudinal direction of the core preforms 20 to deposit the glass particles on the second cladding portion 25.

The third-cladding-portion-arranging step S32 may be conducted in two separate steps, and may be replaced by steps similar to the first-core-preform-arranging step S01 and the first-cladding-portion-arranging step S02, the first-core-preform-arranging step S11 and the first-cladding-portion-arranging step S12, or the first-cladding-portion-arranging and first-core-preform-arranging step S21. Dehydrating, sintering and vitrifying may be conducted after conducting the second-cladding-portion-arranging step S03, and then the third-cladding-portion-arranging step S32 may be conducted.

After that, the dehydration step S04 and the sintering step S05 are conducted in this order to produce the multi-core fiber preform 1 according to the fourth embodiment.

Then the drawing step S06 is conducted by using the multi-core fiber preform 1 similarly to the first embodiment to produce the multi-core fiber 5.

The production method of the multi-core fiber preform 1 according to the above configured fourth embodiment of the present invention includes, after the second-cladding-portion-arranging step S03, the second-core-preform-arranging step S31 in which at least one core preform 20 is disposed at the outer periphery of the second cladding portion 25, and the third-cladding-portion-arranging step S32 in which the third cladding portion 26 formed by depositing the glass particles to surround the second cladding portion 25 and at least one core preform 20 disposed in the second-core-preform-arranging step S31 is disposed.

By this configuration, even if a plurality of the outer core preforms 22 are disposed concentrically and in layers, the cladding portion can be formed step by step, and a gap between the adjacent core preforms 20 can be buried reliably.

Although, for example, the dehydration step S04 and the sintering step S05 are conducted to vitrify the first cladding portion 24 and the second cladding portion 25 in the first embodiment, the first cladding portion 24 and the second cladding portion 25 may not be vitrified to a degree of transparent glass state completely, and may be vitrified to a semi-sintered-glass state or a translucent-glass state. Herein the "translucent-glass state" indicates an apparently opaque state containing closed cells entirely and uniformly. By contrast, the "transparent glass state" indicates an apparently transparent state not containing closed cells entirely and uniformly except a small amount of closed cells remaining in a part of defect portion. In addition, "closed cell" indicates bubble or space formed inside the translucent glass layer and physically isolated from an ambient atmosphere.

Since the bubble inside the multi-core fiber preform 1 in such semi-sintered-glass state can be eliminated in the following drawing step S06, it is possible to make the bubble not remain in the multi-core fiber 4.

As described above, energy required for heating to sinter the optical fiber preform completely can be saved by eliminating the bubble inside the optical fiber preform formed in a semi-sintered state in the following drawing step.

For example, in a case where the bulk densities of the first cladding portion 24 and the second cladding portion 25 both made of silica glass particles are approximately 0.7 g/cm$^3$, the first cladding portion 24 and the second cladding portion 25 can be translucent glass layers containing closed cells inside of which is substantially vacuum by setting dehydration and sintering conditions as follows. Herein "vacuum" indicates the definition by JIS Z 8126, that is, "a state of a certain space filled with gas of which pressure is lower than that of atmosphere".

Dehydration Condition
Dehydration Temperature: 1100° C.
Dehydration Time: Three Hours
Number of Rotating A Preform: 10 rpm
Gas Type and Flow Amount:
  Nitrogen: 10 L/Min.
  Chlorine: 0.5 L/Min.
Sintering Condition
Sintering Temperature: 1400° C.
Heating Rate: 2° C./Min.
Time of Maintaining Sintering Temperature: Three Hours
Pressure Inside Furnace: 100 Pa
Number of Rotating a Preform: 10 rpm At the step of completing the dehydration process and the sintering process, the first cladding portion 24 and the second cladding portion 25 are in state of containing closed cells physically isolated from the ambient atmosphere. This "translucent-glass state" is an apparently opaque state containing closed cells as bubbles physically isolated from the ambient atmosphere entirely and approximately uniformly. Moreover, the surface is smooth and glossy. The densities of the first cladding portion 24 and the second cladding portion 25 in this state are, for example, 95% of densities of a finally perfect transparent glass (density of the silica glass; 2.2 g/cm$^3$), that is, 2.09 g/cm$^3$.

In order to make the first cladding portion 24 and the second cladding portion 25 be in a state having closed cells substantially isolated from the ambient atmosphere, an average density may be equal to or greater than 1.8 g/cm$^3$, preferably equal to or greater than 2.0 g/cm$^3$.

From the view point of preventing bubbles from remaining at the following drawing step, an upper limit exists for the pressure in the sintering step conducted under reduced pressure. As a result of experiments under various conditions, in order to minimize the bubbles remaining in the drawing step, it is particularly preferable that the pressure in the sintering step be equal to or less than 1000 Pa.

According to the embodiments of the present invention, it is possible to produce a large size multi-core fiber preform of which core position accuracy is high.

The above-described embodiments do not limit the present invention. The present invention includes a configuration appropriately combining the above-described elements. Further effects or modification examples can be derived by an ordinary skilled person in the art easily. Therefore, further wide aspects of the present invention are not limited to the specific, detailed, and various modifications may be made.

Figure 20:
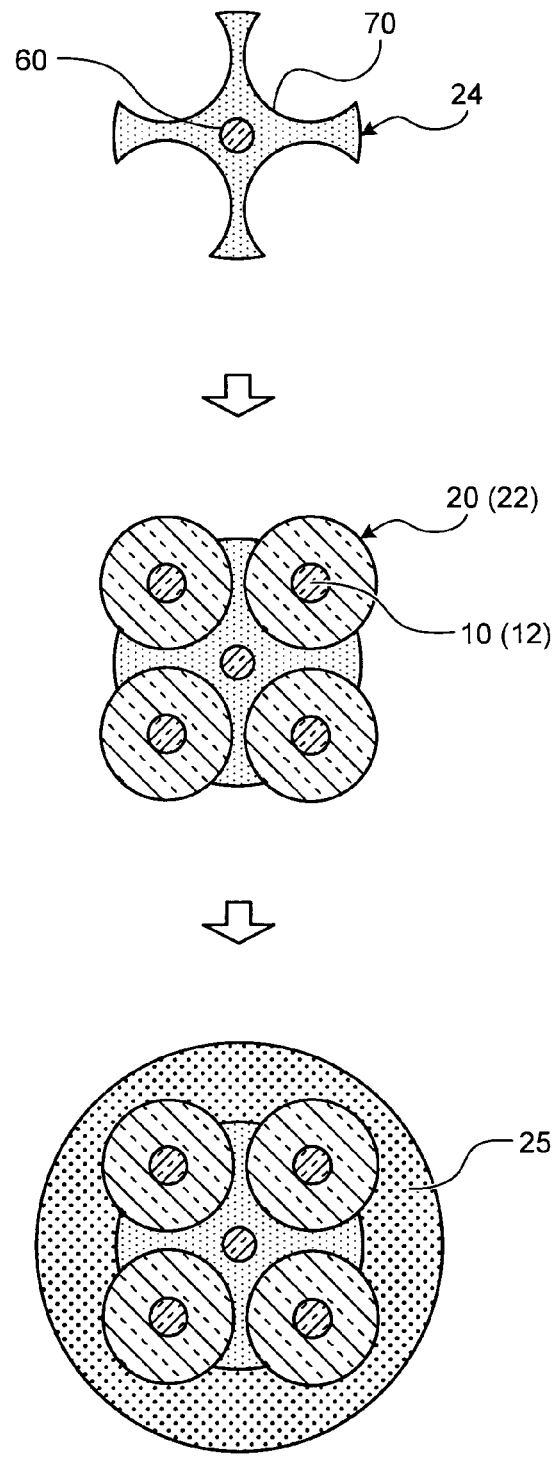
FIG. 20 is a view for explaining a case where core preforms are disposed in a polygonal shape.

For example, the present invention can be adapted to a case where, a hollow glass capillary is used in place of the core preform to form an optical fiber having holes. Moreover, the number of the cores of the optical fiber preforms and the cores of the optical fiber to be produced in the present invention are not limited to 7 and 19. Although, in the above-described embodiment, a case where the outer core preform 22 is disposed around the center core preform 21 has been described, it may be configured that no central core is disposed and core preforms are disposed in a ring shape or polygonal shape. In this case, for example, a glass rod made of a material that is the same as that of the cladding portion may be provided in place of the center core preform. That is, in a case of disposing, for example, in a square, as shown in FIG. 20, at first, a glass rod 60 made of the same material as that of the cladding portion 13 is disposed, the glass particles are deposited on the glass rod 60 to surround the glass rod 60 to form the first cladding portion 24, and then the recessed portions 70 corresponding to the shape of the outer core preforms 22 are formed by milling operation at predetermined positions of the first cladding portion 24. After that, the core preforms 20 (outer core preforms 22) are disposed at the positions of the recessed portions 70 formed on the first cladding portion 24. Moreover, the glass particles are deposited to surround the outer core preforms 22 to form the second cladding portion 25. Also, in this case, it is preferable that, the outer core preforms 22 be disposed after forming the first cladding portion 24 and then making the first cladding portion 24 be in the semi-sintered-glass state. Alternatively, the outer periphery of the first cladding portion 24 may be shrunk thermally by a thermal shrink burner instead of making the first cladding portion 24 in the semi-sintered-glass state.

However, in a case where the first cladding portion is disposed by powder compact method, no glass rod is necessary to be disposed at the center but a collapsed powder compact may be prepared. The present invention is effective for a case of producing the optical fiber preform and the optical fiber of which the number of core portions is equal to or greater than three in particular, and is particularly effective for a case the core portions are configured to be disposed in a regular polygon or in round shape in a cross section of an optical fiber.

For a method of depositing the glass particles, a method of spraying, dropping, and combusting a combustible Si source (for example, Octamethylcyclotetrasiloxane (OMCTS) or the like) may be used.

As described above, the production method of the optical fiber preform and the production method of the optical fiber according to the present invention are suitable for use mainly in the multi-core fiber.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A production method of an optical fiber preform, the method comprising:
    first preparing a first preform having a plurality of glass preforms and a first cladding portion disposed between the plurality of glass preforms; and
    first arranging a second cladding portion to surround the first preform, wherein
    at the first arranging, a material gas and a combustion gas are ejected from a burner to produce glass particles,
    the first preform and the burner are moved relative to each other in a longitudinal direction of the first preform,
    the glass particles are deposited on the first preform, and
    the first preparing includes second arranging a center glass preform as one of the plurality of glass preforms, fourth arranging the first cladding portion in which a material gas and a combustion gas are ejected from a burner to produce glass particles, the center glass preforms and the burner are moved relative to each other in a longitudinal direction of the center glass preforms, and the glass particles are deposited on the center glass preform, and third arranging an outer periphery glass preform as another one of the plurality of glass preforms on an outer periphery of the center glass preform on which the first cladding portion is disposed.

2. The production method of the optical fiber preform according to claim 1, wherein the first cladding portion is disposed so that a cross section of the first preform is close to a round shape.

3. The production method of the optical fiber preform according to claim 1, wherein the first preparing includes second arranging a center glass preform as one of the plurality of glass preforms, third arranging an outer periphery glass preform as another one of the plurality of glass preforms on an outer periphery of the center glass preform, and fourth arranging the first cladding portion in which a material gas and a combustion gas are ejected from a burner to produce glass particles, the center glass preforms and the burner are moved relative to each other in a longitudinal direction of the center glass preforms, and the glass particles are deposited on the center glass preform.

4. The production method of the optical fiber preform according to claim 3, wherein, at the fourth arranging, the glass particles are deposited on the center glass preform while rotating the plurality of glass preforms around center axes of the respective glass preforms.

5. The production method of the optical fiber preform according to claim 1, wherein the first preparing includes fifth arranging the first cladding portion in which a glass rod is disposed in a gap between adjacent glass preforms of the plurality of glass preforms.

6. The production method of the optical fiber preform according to claim 1, further comprising, next to the fourth arranging, first forming a recessed portion extending in a longitudinal direction of the first preform at an outer periphery of the first cladding portion, wherein
at the third arranging, the outer periphery glass preform is disposed at a position corresponding to the recessed portion.

7. The production method of the optical fiber preform according to claim 1, wherein the first cladding portion is a columnar-shaped member on which a recessed portion extending in a longitudinal direction of the first preform, and the first preparing includes sixth arranging in which the glass preform is disposed at a position corresponding to the recessed portion.

8. The production method of the optical fiber preform according to claim 1, further comprising, next to the first arranging:
seventh arranging at least one glass preform at an outer periphery of the second cladding portion; and
eighth arranging in which a material gas and a combustion gas are ejected from a burner to produce glass particles, the arranged second cladding portion and the burner are moved relative to each other in the longitudinal direction of the second cladding portion, and a third cladding portion is arranged by depositing the glass particles on the second cladding portion.

9. A production method of an optical fiber in which an optical fiber preform is drawn which is produced by the production method of the optical fiber preform according to claim 1.

10. A production method of an optical fiber preform, the method comprising:
first preparing a first preform having a plurality of glass preforms and a first cladding portion disposed between the plurality of glass preforms; and
first arranging a second cladding portion to surround the first preform, wherein
at the first arranging, a material gas and a combustion gas are ejected from a burner to produce glass particles,
the first preform and the burner are moved relative to each other in a longitudinal direction of the first preform,
the glass particles are deposited on the first preform, and
the first cladding portion is a columnar-shaped member on which a recessed portion extending in a longitudinal direction of the first preform, and the first preparing includes sixth arranging in which the glass preform is disposed at a position corresponding to the recessed portion.

11. The production method of the optical fiber preform according to claim 10, wherein the first cladding portion is made of a powder compact.

12. The production method of the optical fiber preform according to claim 10, wherein the first cladding portion is made of glass.

13. The production method of the optical fiber preform according to claim 10, wherein the first cladding portion is made of semi-sintered glass.

14. The production method of the optical fiber preform according to claim 10, further comprising, next to the first arranging:
seventh arranging at least one glass preform at an outer periphery of the second cladding portion; and
eighth arranging in which a material gas and a combustion gas are ejected from a burner to produce glass particles, the arranged second cladding portion and the burner are moved relative to each other in the longitudinal direction of the second cladding portion, and a third cladding portion is arranged by depositing the glass particles on the second cladding portion.

15. A production method of an optical fiber in which an optical fiber preform is drawn which is produced by the production method of the optical fiber preform according to claim 10.

16. A production method of an optical fiber preform, the method comprising:
first preparing a first preform having a plurality of glass preforms and a first cladding portion disposed between the plurality of glass preforms; and
first arranging a second cladding portion to surround the first preform, wherein
at the first arranging, a material gas and a combustion gas are ejected from a burner to produce glass particles,
the first preform and the burner are moved relative to each other in a longitudinal direction of the first preform,
the glass particles are deposited on the first preform,
the method further comprising, next to the first arranging:
seventh arranging at least one glass preform at an outer periphery of the second cladding portion; and
eighth arranging in which a material gas and a combustion gas are ejected from a burner to produce glass particles, the arranged second cladding portion and the burner are moved relative to each other in the longitudinal direction of the second cladding portion, and a third cladding portion is arranged by depositing the glass particles on the second cladding portion.

17. A production method of an optical fiber in which an optical fiber preform is drawn which is produced by the production method of the optical fiber preform according to claim 16.

* * * * *